US010605252B2

(12) United States Patent
Köcher et al.

(10) Patent No.: US 10,605,252 B2
(45) Date of Patent: Mar. 31, 2020

(54) METHOD FOR CONTROLLING A MOTOR FOR A FAN IN A HEAT EXCHANGER, CONTROL APPARATUS FOR A FAN AND HEAT EXCHANGER

(71) Applicant: GÜNTNER GMBH & CO. KG, Fürstenfeldbruck (DE)

(72) Inventors: Jörg Köcher, Utting (DE); Markus Jabs, Lichtenau (DE); Reiner Riess, Otterfing (DE)

(73) Assignee: GÜNTNER GMBH & CO. KG, Fürstenfeldbruck (DE)

( * ) Notice: Subject to any disclaimer, the term of this patent is extended or adjusted under 35 U.S.C. 154(b) by 235 days.

(21) Appl. No.: 15/027,895

(22) PCT Filed: Oct. 3, 2014

(86) PCT No.: PCT/EP2014/071261
§ 371 (c)(1),
(2) Date: Apr. 7, 2016

(87) PCT Pub. No.: WO2015/058945
PCT Pub. Date: Apr. 30, 2015

(65) Prior Publication Data
US 2016/0258439 A1  Sep. 8, 2016

(30) Foreign Application Priority Data
Oct. 23, 2013 (EP) .................................... 13189969

(51) Int. Cl.
*F04D 27/00* (2006.01)
*F04D 19/00* (2006.01)
(Continued)

(52) U.S. Cl.
CPC ......... *F04D 27/004* (2013.01); *F04D 19/002* (2013.01); *F04D 25/06* (2013.01);
(Continued)

(58) Field of Classification Search
CPC .... F04D 27/004; F04D 27/008; F04D 19/002; F04D 25/06; F04D 29/701; F04D 27/001;
(Continued)

(56) References Cited

U.S. PATENT DOCUMENTS 5,137,428 A  8/1992  Poll et al.
6,170,480 B1  1/2001  Melink et al.
(Continued)

FOREIGN PATENT DOCUMENTS

DE  20218951 U1  2/2003
EP  2543888 A1  1/2013

*Primary Examiner* — Charles G Freay
*Assistant Examiner* — Christopher J Brunjes
(74) *Attorney, Agent, or Firm* — Global IP Counselors, LLP

(57) ABSTRACT

A method of controlling a motor of a ventilator of a heat exchanger, the method includes detecting a starting behavior of the motor, detecting a starting obstacle of the motor, setting the starting behavior of the motor in accordance with a predefined scheme of correction, and setting at least one of a torque of the motor is set and a direction of rotation of the motor is set, and the direction of the motor being reversed.

12 Claims, 3 Drawing Sheets

(51) Int. Cl.
*F24F 11/30* (2018.01)
*F24F 11/77* (2018.01)
*F04D 29/70* (2006.01)
*F04D 25/06* (2006.01)
*F24F 1/0029* (2019.01)
*F24F 110/10* (2018.01)
*F24F 11/32* (2018.01)

(52) U.S. Cl.
CPC ......... *F04D 27/008* (2013.01); *F04D 29/701* (2013.01); *F24F 1/0029* (2013.01); *F24F 11/30* (2018.01); *F24F 11/77* (2018.01); *F05D 2260/85* (2013.01); *F24F 11/32* (2018.01); *F24F 2110/10* (2018.01)

(58) Field of Classification Search
CPC .. F24F 1/0029; F24F 11/0012; F24F 11/0079; F24F 11/0052; F05D 2260/85; F04B 2201/12; F04B 2201/1201; F04B 2201/1202
USPC .................................. 415/1, 13, 15
See application file for complete search history.

(56) References Cited

U.S. PATENT DOCUMENTS

| | | | | |
|---|---|---|---|---|
| 2002/0101714 | A1* | 8/2002 | Osecky | G06F 1/206 361/679.48 |
| 2004/0018079 | A1* | 1/2004 | Miller | F04D 27/008 415/1 |
| 2010/0314941 | A1* | 12/2010 | Schulzman | F04D 25/068 307/40 |

\* cited by examiner

METHOD FOR CONTROLLING A MOTOR FOR A FAN IN A HEAT EXCHANGER, CONTROL APPARATUS FOR A FAN AND HEAT EXCHANGER

CROSS-REFERENCE APPLICATION

This application is a U.S. National Stage Application of International Application No. PCT/EP2014/071261, filed Oct. 3, 2014, which claims priority to European Application No. 13189969.2, filed Oct. 23, 2013, the contents of each of which is hereby incorporated herein by reference.

BACKGROUND

Field of Invention

The invention relates to a method of controlling a motor of a ventilator of a heat exchanger, to a control apparatus for a ventilator and to a heat exchanger.

Background Information

Methods of controlling a motor of a ventilator of a heat exchanger are already known in which the starting behavior of the motor is detected.

SUMMARY

The invention is in particular based on the object of improving the starting safety of the heat exchanger, in particular of the ventilator.

It is satisfied by a method in accordance with the invention of controlling a motor of a ventilator of a heat exchanger as described herein, by a control apparatus for a ventilator as described herein and by a heat exchanger as described herein.

The invention is based on a method of controlling a motor of a ventilator of a heat exchanger, wherein a starting behavior of the motor is recorded.

It is suggested that a starting obstacle of the motor is detected and that the starting behavior of the motor is set in accordance with a predefined scheme of correction.

In this connection a starting obstacle of the motor is understood such that the ventilator, albeit being controlled, cannot even start or at least only starts with difficulties which besides an increase in wear of associated machine components, such as bearings, drive motor etc. can also lead to an increased energy consumption and in this way finally to an ineffective operation behavior. The starting obstacle can be a blocked or at least partly blocked fan wheel of the ventilator, such that the ventilator can only start, for example, with an increased starting load. For example, the fan wheel can be blocked by dirt, snow, ice, corrosion such as rust or through other undesired mechanisms. However, the starting obstacle can also be a different blockage of the ventilator, in particular of the motor or of the fan wheel. The starting obstacle of the motor can, for example, be detected thereby that a set of number of rotations cannot be achieved or an increased current demand of the motor can be detected. In practice, a starting obstacle can naturally also be detected by other measures generally known to the person of ordinary skill in the art.

The starting behavior of the motor is set in accordance with a predefined scheme of correction in accordance with the invention. A predefined scheme of correction, amongst other things, can be understood, besides measures known per se, as a setting of a torque and/or of a direction of rotation and/or e.g. as an electrical drive current or as an electrical drive voltage. Torques and/or the direction of rotation and/or other setting parameters, such as e.g. the electrical drive voltage and/or the electrical drive current can in this respect be changed by a method in accordance with the invention, can in particular be controlled and/or regulated. The scheme of correction can in this connection provide that the torque in particular is increased and/or that the torque and/or that the direction of rotation can be changed in a predefined sequence. Thereby an alternating torque can be applied to the motor by which the ventilator, in particular the fan wheel, can be set to oscillate which can overcome the starting obstacle, in particular a mechanical blockage.

Thereby, for example the fan wheel can be broken away and the blockage can be released.

Advantageously, the starting hindrance of the motor can be detected thereby and the starting behavior of the motor can be set in accordance with a predefined scheme of correction, in particular that the torque and/or the direction of rotation and/or a different operating parameter of the motor is changed thereby, for example when the motor is blocked, a starting safety can be increased and the starting behavior and/or the energy efficiency can be improved. Blocked ventilators can again be automatically placed into operation and the ventilator can, for example, be deiced by a heating of the motor which facilitates a "breaking away" of the ventilator.

Advantageously, for example, an malfunction message can thereby be generated, also then when the ventilator and/or the motor do/does not have the set torque or the set number of rotations. A further advantage is that a layer of snow or a layer of ice can thereby be prevented t from accruing at the ventilators. Thus, a longer lifetime of the ventilator and/or of a storage of the ventilator can be achieved. Moreover, an early recognition of the defect of the ventilator or of the motor is thus possible and a regular automatic removal of, for example, snow at the ventilator or at protective grid can be achieved.

In a specific embodiment of the invention, the torque of the motor and/or the direction of rotation of the motor can be set. The torque of the motor can be changed up to a predefined target torque and/or the direction of the motor can be changed. The method steps "a torque of the motor can be set and/or a direction of rotation of the motor can be set" can in particular be understood such that the operating parameters changing in time with respect to the motor can be set, such as in particular a current changing in time and/or a voltage changing in time can be set. The target torque can correspond to the maximum torque or alternatively also to a different lower torque.

The torque of the motor can be changed up to the predefined target torque. The target torque can be achieved by a step-wise and/or section-wise or continuous, for example, increase of the torque. The direction of rotation of the motor can, for example, be changed in a defined period of time, thus likewise step-wise or section-wise or continuously.

Amongst other things, controlling and/or regulating can in particular be understood as setting. Controlling is to be understood such that a parameter can be changed, in a specific embodiment the torque and/or the number of rotations can, for example be changed. Regulating is to be understood such that the parameter can, for example, be detected, recorded or measured and that a calculated or predefined value can be maintained in order to influence or to maintain, for example, the torque or the number of rotations. Moreover, "can be set" can also be understood as a correspondingly program-controlled process, in particular a programming. The target torque has the advantage that the torque can thereby be limited, whereby an overload of the motor and/or of the fan wheel can be avoided. A further advantage is that the torque and/or a direction of rotation of the motor can be set or changed thereby, the starting safety of the heat exchanger, in particular of the ventilator can be improved. Thus, for example, a layer of dirt, snow or ice formed at the ventilator, which prevents the starting of the ventilator, can be removed.

In an embodiment particularly relevant for practice of the invention the torque is successively increased. The direction of rotation of the motor can in this respect be reversed. Thereby a periodicity in the alternating torque can be achieved, whereby in particular a self-oscillation, which the ventilator can have, can be advantageously used. Thereby the torque acting on the blockage can be further increased, whereby an effectivity of the control of the motor can be further increased. As has already been described, the torque can be increased step-wise or section-wise or continuously and the direction of rotation of the motor can likewise be changed step-wise or section-wise respectively or continuously.

"Changed step-wise and/or section-wise" in this connection should be understood, in particular such that, for example, a plurality of successive sections of time can be determined by means of a parameter during which the motor can be set in similar, in particular periodically repeating sections of time, this means controlled. The torque can be successively increased whereby at least a load of the motor and/or of the fan wheel can be maintained at a low level and small blockages can be released without a wear being increased. At the same time it can be ensured that also stronger blockages can be safely released. "Successive" should in this connection in particular be understood such that the torque is increased step-wise and/or section-wise or continuously. In particular, "successively increased" should also be understood such that the target torque with which the motor is controlled in a section is successively increased.

In an embodiment of the invention, the torque can be increased after the torque was reversed. Moreover, after achieving the target torque the torque is reversed. Thereby an alternating torque can be achieved which is particularly advantageously suitable for breaking away the fan wheel. An "alternating torque" should in this connection in particular be understood as a torque which oscillates about one value. The torque as an oriented parameter can, in particular be oriented in the same direction or can change its direction in accordance with the particular advantageous embodiment.

It is in particular advantageous when the torque is increased after the direction of rotation was reversed. Thereby the torque is increased after each reversal of the direction, whereby the breaking away of the fan wheel is particularly facilitated. The increase of the torque in this connection in particular also has the effect that the motor is heated which additionally facilitates the breaking away when the fan wheel is blocked by snow or ice. By means of such a design it can thus be achieved in a particularly favorable manner that the fan wheel is broken away when it is blocked by snow or ice. The torque is in particular also reversed after achieving the target torque and a period of time, within which it is attempted to break away the fan wheel, can be particularly long, whereby an efficiency can be further increased.

In an embodiment of the invention a downtime of the motor of the ventilator is detected. The motor of the ventilator starts after achieving a target downtime when no requirements of load of the heat exchanger are detected. Moreover, the motor of the ventilator is changed to a regular mode of operation when a requirement of load exists.

The downtime can be a defined period of time. The target downtime can be a maximum value of the downtime. "No requirements of load" can be understood such that a heat exchanger is not operated as, for example, no external requirements of load with regard to the heat exchanger are present. A "regular mode of operation" can be understood such that the heat exchanger, in particular the ventilator and/or the motor of the ventilator are only operated when the requirement of the load exists. The ventilator and/or the motor of the ventilator are not operated when no requirements of load exist. The starting of the ventilators and/or of the motor of the ventilators can only take place in a maintenance run when no requirement of load is present having regard to the heat exchanger. In particular the ventilator and/or the motor of the ventilator are only operated in this connection when no normal mode of operation is required, this means when no requirement of load exists. In order to prevent a ceasing of the ventilators these can be started in dependence on the target downtime in a maintenance mode also when no requirement of load exists.

Starting in accordance with these conditions can also be understood as a maintenance run. If a requirement of load exists during a maintenance run, a change from the maintenance run into the regular mode of operation can automatically be brought about. The motor can be set and operated with the target torque and/or a maximum number of rotations. The motor can, however, also be set and operated at a lower torque and/or at a lower number of rotations. Advantageously, a malfunction message can be generated when the ventilator and/or the motor do not have the set torque or the set number of rotations. It is advantageous that a snow layer or ice layer can thereby be prevented from accruing at the ventilators. Thus, a longer lifetime of the ventilator and/or of the storage of the ventilator can be achieved. Moreover, an early recognition of a defect at the ventilator or motor is thus possible and a regular automatic removal of, for example, snow from the ventilator or from the protective grid can be achieved.

In a further embodiment of the invention an ambient temperature of the heat exchanger is detected. Thereby, the method can be adapted to further environmental conditions, it can in particular be configured for different temperature ranges. For example, it can be set or controlled in a different manner, when it can be excluded by means of the temperature range that the fan wheel is blocked by snow or by ice.

The invention furthermore relates to a control apparatus for a ventilator of a heat exchanger for carrying out a method, wherein the control apparatus registers a starting behavior of the motor. "Note: The invention does not work from the control. Then the control would not be a part of the invention!"

It is suggested that the control apparatus is configured in such a way that the control apparatus detects a starting obstacle of the motor and sets the starting behavior of the motor in accordance with a predefined scheme of correction.

The control apparatus can be a control unit or a control device known per se which can control and regulate or alternatively it can be a programmable memory element or a memory element with a fixedly programmable function. The control apparatus can in practice particularly advantageously receive and transmit information, as well as carry out technical calculations. The control apparatus can set a torque and/or a number of rotations. The control apparatus can alternatively possibly also set further parameters. The control apparatus can receive the information, for example, from one or more sensors, by means of which, for example, parameters are measured or calculated. The control apparatus can, however, also receive further information, for example, from further sensors of a control unit or from a further control apparatus. The control apparatus can be configured as a part of the heat exchanger, this means it can be fastened, for example, within or outside of a housing of the heat exchanger or it can be arranged independently of the heat exchanger, for example within a space or a control cabinet. The control apparatus can be connected in a signal communicating manner to the sensors of the control unit or of a further control apparatus and can communicate, for example by a cable or also wirelessly, for example by wireless transmission. Controlling can be understood such that a parameter, for example a torque and/or a number of rotations, can be changed by the control apparatus. Regulating can be understood such that a parameter, for example the torque and/or the number of rotations, is recorded or measured and a calculated and/or predefined value is maintained or can be influenced. A control apparatus can in particular be understood as a unit comprising at least one control electronics. A "control electronics" can in particular be understood as a unit having a processor unit and having a memory unit as well as having an operating program stored in the memory unit.

In a specific embodiment, the control apparatus is configured in such a way that the control apparatus detects a starting obstacle of the motor and sets the starting behavior of the motor in accordance with a predefined scheme of correction. A predefined scheme of correction can be understood as a setting of the torque and/or of a direction of rotation and/or of an electrical drive current and/or of a drive voltage and/or of a different operating parameter. The torque and/or the direction of rotation can in this connection be changed. The scheme of correction in this respect can enable the torque to be increased and/or the torque and/or the number of rotations can be changed in a predefined sequence. Thereby an alternating torque can be applied at the motor by means of which the ventilator, in particular the fan wheel can be set to oscillate which oscillation can overcome the starting obstacle, in particular a mechanical blockage. Thereby, for example, the fan wheel can be torn away and the blockage can be released.

Advantageously, an malfunction message can thus be generated when the ventilator and/or the motor do not have the set torque or the set number of rotations. It is a further advantage that a layer of snow or a layer of ice can thereby be prevented from accruing at the ventilators. Thus, a longer lifetime of the ventilator and/or of the storage of the ventilator can be achieved. Moreover, an early recognition of a defect of the ventilator or motor is thus possible and a regular automatic removal of, for example, snow from the ventilator or from the protective grid can be achieved. In this way, the starting safety can thereby be increased.

In an embodiment of the invention, at least one sensor is provided and the sensor detects a starting behavior of the motor and detects a starting obstacle of the motor. Moreover, the control apparatus is configured in such a way that the control apparatus sets a torque of the motor and/or such that it sets a direction of rotation of the motor and/or such that it increases the torque of the motor up to a predefined target torque and/or such that it changes the direction of rotation of the motor. The sensor can, for example, record and detect a current or a number of rotations.

Thus, the control apparatus can advantageously be retrofitted with or without a sensor at present heat exchangers.

Moreover, a heat exchanger comprising a ventilator and a control apparatus is suggested. Advantageously, a ventilator and/or a control apparatus can be retrofitted at a heat exchanger, for example with EC ventilators or ventilators facilitating a change of direction by means of a small demand in effort and cost from a control technological point of view possibly by a modification of the ventilators.

Further advantages result from the following description of the Figures. An embodiment of the invention is illustrated in the Figures. The Figures, the description of the Figures and the claims include numerous features in combination with one another. The person of ordinary skill in the art will expediently also consider these features on their own and combine these to suitable further combinations.

BRIEF DESCRIPTION OF THE DRAWINGS

The invention will be explained in more detail hereinafter with reference to the drawings.

DETAILED DESCRIPTION OF THE EMBODIMENTS

Figure 1:
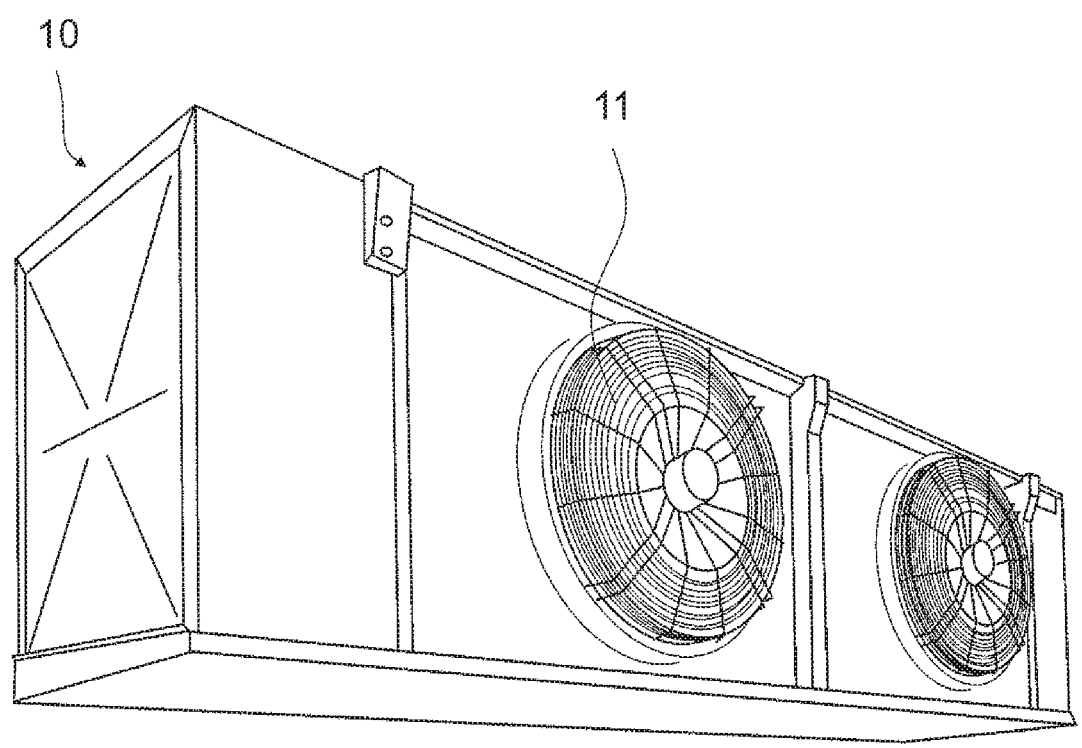
FIG. 1 illustrates an exemplary heat exchanger for which a control apparatus in accordance with the invention.

FIG. 1 shows a heat exchanger 10 which is provided for an air conditioning unit or a cooling unit such as they are in particular used in the commercial sector or in the industrial sector. The heat exchanger 10 is for exchanging heat energy between a coolant, such as for example $CO_2$, HFC, $NH_3$ or glycol, and an air flow. For example, the heat exchanger 10 can be configured as an evaporator which is for evaporating the coolant to remove heat energy from the coolant. In a similar manner, the heat exchanger 10 can however also be configured as an air cooler which is for the purpose of bringing about a heat transfer from the coolant to the air flow.

The heat exchanger 10 comprises a module which can, for example, include a plurality of transfer elements and a plurality of heat exchanger fins. The transfer elements can be configured as tubes or as an extruded section having a plurality of passages. The heat exchanger fins can for example have the shape of ribs or edged strips of sheet metal in finned shape. The heat exchanger ribs can be connected to the transfer elements in a heat conducting manner and can form an air passage. The heat exchanger can moreover comprise a ventilator, wherein the ventilator can produce an air flow in the air passage. The ventilator 11 can in this respect generally be configured as a pressure blower which is arranged along a direction of flow of the gas flow upstream of the heat exchanger. Preferably, the ventilator 11 is alternatively arranged along the direction of flow downstream of the heat exchanger, this means that the ventilator 11 is provided for the purpose of generating a negative pressure in the air passage in which the heat exchanger is arranged. Moreover, a wetting apparatus can be arranged at the heat exchanger and wet the heat exchanger with a wetting fluid.

The ventilator 11 comprises a motor and a fan wheel, the fan wheel being driven by means of the motor. In order to control the ventilator 11 the heat exchanger 10 comprises a control apparatus that is not illustrated in detail. The control apparatus comprises a control and regulation unit which is provided for the purpose of setting the motor of the ventilator 11. Moreover, the control apparatus can comprise at least one sensor that is provided for detecting a start of the motor by means of the control and regulation unit. The sensor can, for example, be configured as a sensor for a number of rotations, the sensor being provided for the purpose of directly detecting a number of rotations of the motor or of the fan wheel. Alternatively, also a design as a current sensor is also plausible which is for the purpose of recording the start of the motor by a current curve or also a different design of the sensor is plausible.

The heat exchanger 10 is provided for the purpose of being arranged in a temperature controlled region or an outside region. Thereby ice or snow can in particular be collected in the region of the fan wheel. Having regard to an arrangement of the heat exchanger 10 in an outer region, the snow and the ice are climatic influences that the ventilator 11 is subjected too. Having regard to an arrangement in a temperature controlled room, for example, in a walk-in freezer or a vehicle testing plant, temperatures of below zero degrees can likewise be present by means of which snow or ice can form at the ventilator 11 when this is switched off. On starting in particular snow and ice block the fan wheel, whereby the motor is blocked. In a similar manner alternatively also different effects can block the fan wheel.

The control apparatus is for the purpose of recognizing a blocking of the motor by the sensor. The control apparatus becomes active when it is determined that the motor does not start albeit a corresponding control. If the control apparatus recognizes that the motor is blocked, then the control apparatus changes the torque 12 and the direction of rotation 14 by which the motor is controlled. The control apparatus 10 attempts to break away the fan wheel.

Moreover, the control apparatus is for changing the torque 12 and the direction of rotation 14 section-wise. A parameter is stored in the control apparatus which determines a period of time. The period of time can in this respect comprise a like period of time. However, it is generally also plausible that the period of time changes during which the control apparatus attempts to break away the fan wheel. The periods of time respectively form sections 15 in the operating program for breaking away the fan wheel.

The torque 12 is successively increased. A parameter is, for example, stored in the control apparatus by means of which the torque 12 is successively increased. In this respect the control apparatus increases the torque 12 which the motor should perform in the corresponding section 15 in each section 15. The torque 12 is, for example, increased by means of the control apparatus in which values for a voltage and/or a current are set for the motor, which deviate from values of the preceding section 15.

A target torque 13 for the torque 12 is stored as a further parameter in the control apparatus. The target torque 13 determines maximum values for the voltage and/or for the current by means of which the motor is controlled for breaking away the fan wheel. The control apparatus increases the torque 12 successively for so long in the sections 15 until the target torque 13 is achieved.

The direction of rotation 14 is reversed when the motor is blocked. The control apparatus in this respect reverses the direction of rotation 14 with which the motor is controlled in each section 15. Through the section-wise control with a respective reversal of the direction of rotation 14 for a continuously increasing torque 12 the motor generates an alternating torque by means of which the fan wheel can start to oscillate. In particular for small angles the motor and the fan wheel form an oscillating system having a natural frequency. The length of the periods of time which each section 15 has is preferably matched to the natural frequency. Small angles in this connection are in particular angles of rotation which are smaller than an angular spacing between different polarized regions of a permanent magnet of the motor. The motor typically has a plurality of angles of rotation of which the permanent magnet and a coil interacting with the permanent magnet take on relative to one another when the motor is not subjected to a current. If the fan wheel is moved about angles that are smaller than the spacing of the angle of rotation which the permanent magnet and the coil can take on with respect to one another, then the motor can be controlled by the alternating torque which corresponds to the natural frequency.

Due to the fact that the control apparatus is for increasing the torque 12 after the direction of rotation 14 was reversed the motor is initially controlled with an alternating torque in the operating program whose amplitude is constantly increased in the section 15 up until the stored maximum value for the torque 12 is reached. The control apparatus is for reversing the torque 12 after reaching the maximum torque 13. The amplitude of the alternating torque thus initially increases constantly and subsequently remains constant.

If the control apparatus, for example, recognizes that the fan wheel has broken away by the sensor, then the control apparatus stops the breaking away of the fan wheel and starts the regular mode of operation which is for a continuous mode of operation. Termination conditions can furthermore be stored in the control apparatus having regard to which the control apparatus terminates the breaking away of the fan wheel, such as for example, a number of sections 15 which are configured to indicate a constant in time or motor values which indicate an overloading of the motor.

In order to be able to differentiate between different blockages of the fan wheel the control apparatus can furthermore comprise a temperature sensor that is provided for the purpose of determining an environmental temperature. The temperature sensor is preferably arranged in the region of the fan wheel and determines an ambient temperature in the region of the fan wheel. Since the fan wheel can merely be blocked by snow and/or ice at low temperatures, in particular below 0 degrees, the parameter and/or the termination conditions used can have a dependency, this dependency being dependent on the sensor value determined by means of the temperature sensor.

For example, termination can be carried out later for lower temperatures than for higher temperatures. In particular, when the control apparatus recognizes that the fan wheel starts to oscillate due to the alternating torque and at the same time the sensor value of the temperature sensor provides sensor values which indicate a blockage of the fan wheel by snow or ice, a substantially longer operating time can be present than if the temperature sensor provides sensor values in which a blockage by snow or ice can be excluded.

Figure 2:
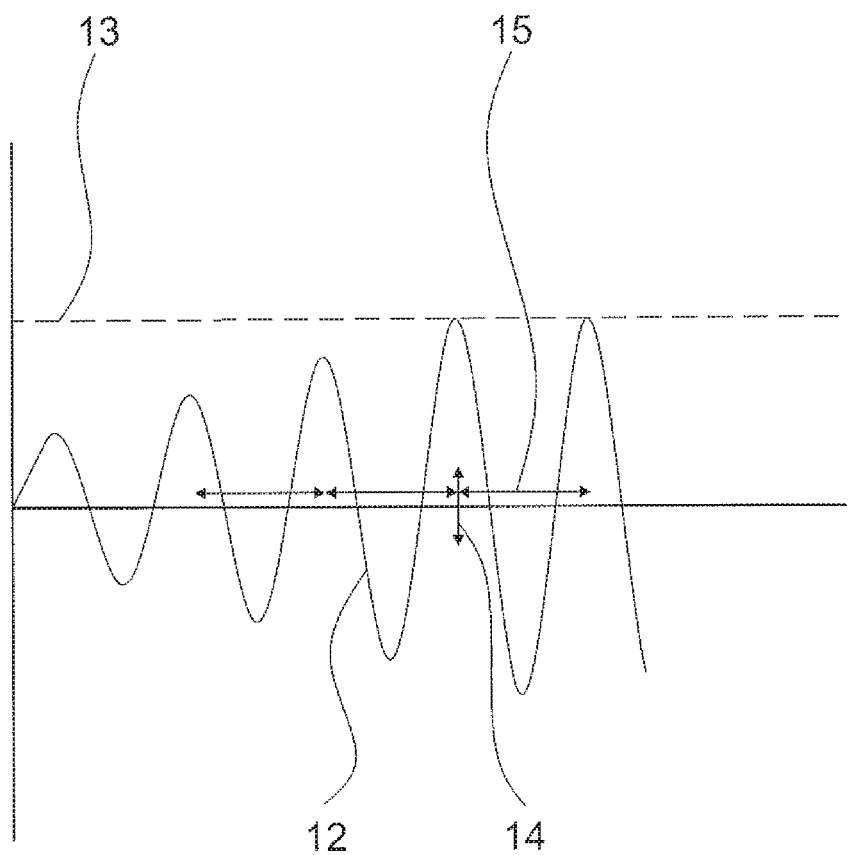
FIG. 2 is a schematic torque curve by which a motor of the heat exchanger can be controlled for breaking away a ventilator.
Figure 3:
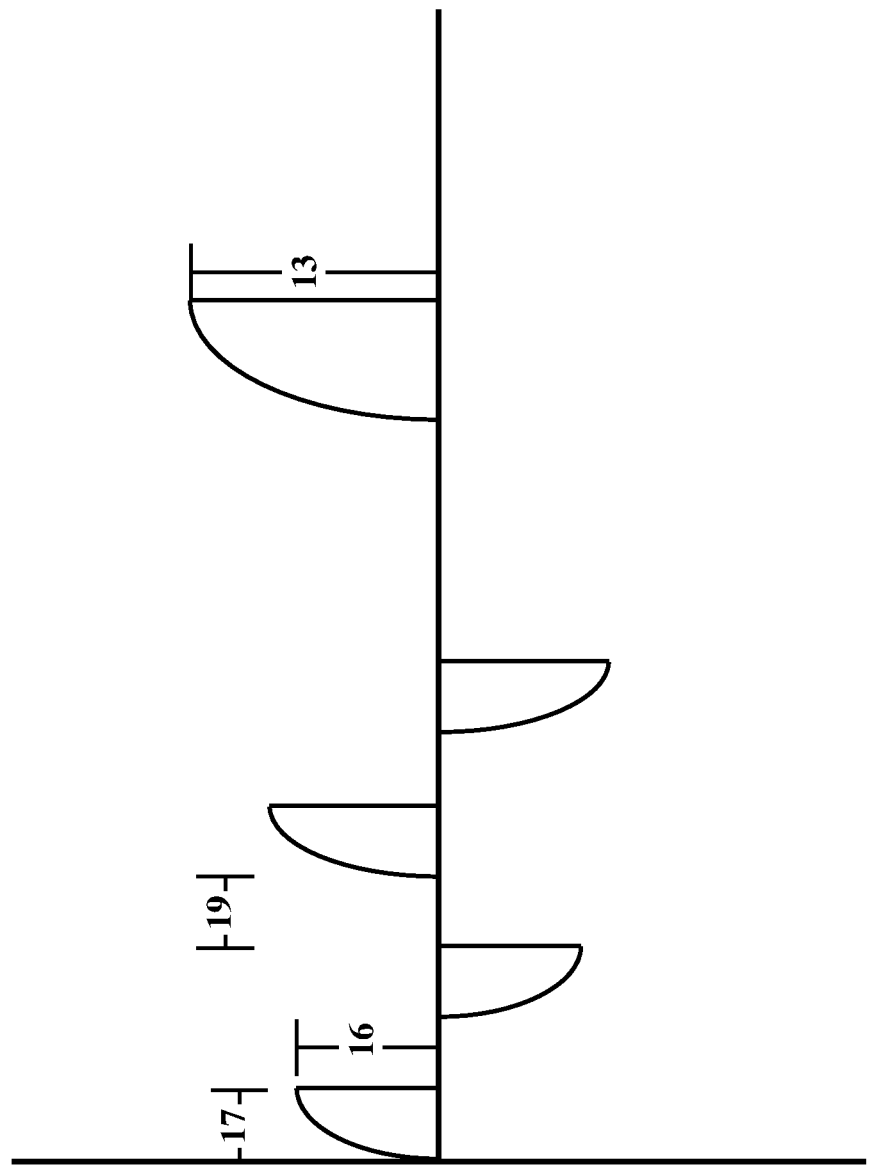
FIG. 3 is a further schematic torque curve by which a motor of the heat exchanger can be controlled for breaking away the ventilator.

FIG. 3 schematically shows a further torque curve by means of which a motor of the heat exchanger can be controlled for breaking away a ventilator. FIG. 3 substantially corresponds to FIG. 2, which is why reference is only made to the differences. The time is applied on the abscissa and the torque 12 is applied at the ordinate, the torque 12 being successively increased. It is initially recognized during a detection time 17 whether the rotation with a starting torque 16 was successful. Thus, a starting obstacle is detected. The increase of the torque 12 takes place in each section (see FIG. 2, 15), for example, in a regular or irregular spacing in time. The increase of the torque in this connection takes place up to the target torque 13.

What is claimed is:

1. A method of controlling a motor of a ventilator of a heat exchanger, comprising:
    detecting a starting behavior of the motor;
    detecting a starting obstacle of the motor;
    setting the starting behavior of the motor in accordance with a predefined scheme of correction, the predefined scheme comprising
    setting at least one of a torque of the motor and a direction of rotation of the motor, and the direction of rotation of the motor being reversed section wise and increasing the torque step-wise until the starting obstacle of the motor is removed.

2. The method of controlling a ventilator in accordance with claim 1, further comprising changing at least one of the torque up to a predefined target torque and the direction of rotation of the motor.

3. The method of controlling a ventilator in accordance with claim 1, further comprising, after arriving at a target torque, reversing the torque.

4. The method of controlling a ventilator in accordance with claim 1, further comprising detecting a downtime of the motor of the ventilator.

5. The method of controlling a ventilator in accordance with claim 1, further comprising starting the motor of the ventilator after reaching a target downtime, when no requirement of load of the heat exchanger is detected.

6. The method of controlling a ventilator in accordance with claim 1, further comprising changing the motor of the ventilator to a regular mode of operation when a requirement of load is present.

7. The method of controlling a ventilator in accordance with claim 1, further comprising detecting an environmental temperature of the heat exchanger.

8. A controller for a ventilator of a heat exchanger for carrying out a method in accordance with claim 1, the controller configured to detect the starting behavior of the motor in an operating state, to detect the starting obstacle of the motor, to set the starting behavior of the motor in accordance with the predefined scheme of correction, the predefined scheme comprising setting at least one of the torque of the motor and the direction of rotation of the motor and change the direction of rotation of the motor section wise, and the controller further configured to successively increase the torque.

9. The controller in accordance with claim 8, further including at least one sensor, the sensor being configured to record the starting behavior of the motor and detect the starting obstacle of the motor.

10. The controller in accordance with claim 8, wherein the controller is configured to increase the torque of the motor up to a predefined target torque.

11. A heat exchanger comprising:
    a ventilator configured to be operated in accordance with the method in accordance with claim 1, a controller configured to control the ventilator, and a sensor configured to detect the starting behavior for the motor.

12. A heat exchanger comprising:
    a controller for a ventilator of a heat exchanger configured to carry out the method in accordance with claim 1, the controller configured to detect the starting behavior of the motor in an operating state, to detect the starting obstacle of the motor, to set the starting behavior of the motor in accordance with the predefined scheme of correction, the predefined scheme comprising setting at least one of the torque of the motor and the direction of rotation of the motor and change the direction of rotation of the motor section wise, and the controller further configured to successively increase the torque.

* * * * *